United States Patent [19]

Gilpin et al.

[11] 3,914,846

[45] Oct. 28, 1975

[54] HIGH DENSITY INSB PV IR DETECTORS

[75] Inventors: James B. Gilpin, Cotati; Donald G. Skvarna, Goleta, both of Calif.

[73] Assignee: The United States of America as represented by the Secretary of the Navy, Washington, D.C.

[22] Filed: June 15, 1972

[21] Appl. No.: 263,720

[52] U.S. Cl. .................... 29/583; 29/580; 156/17

[51] Int. Cl.[2] .................... B23Q 1/00

[58] Field of Search .............. 29/572, 580, 583, 569; 51/283; 156/16, 17

[56] References Cited

UNITED STATES PATENTS

| | | | |
|---|---|---|---|
| 2,563,503 | 8/1951 | Wallace | 29/580 |
| 3,255,005 | 6/1966 | Green | 156/17 UX |
| 3,496,617 | 2/1970 | Cook et al. | 29/583 X |
| 3,510,371 | 5/1970 | Frankson | 156/17 X |
| 3,585,714 | 6/1971 | Li | 29/580 |
| 3,592,708 | 7/1971 | Collins et al. | 156/17 |
| 3,700,510 | 10/1972 | Keene et al. | 156/17 X |

*Primary Examiner*—Harvey E. Behrend
*Assistant Examiner*—Harold Tudor
*Attorney, Agent, or Firm*—R. S. Sciascia; Roy Miller; Lloyd E. K. Pohl

[57] ABSTRACT

A method for fabricating an array of photodiodes on a curved surface for best matching with optical systems.

1 Claim, 4 Drawing Figures

HIGH DENSITY INSB PV IR DETECTORS

BACKGROUND OF THE INVENTION

1. Field of the Invention.

This invention relates to the fabrication of arrays of photodiodes. More particularly, this invention relates to the fabrication of arrays of photodiodes on curved surfaces.

2. Description of the Prior Art.

It is well known to use arrays of photodiodes as sensing devices in sensors for guided missiles and the like. One method for fabricating photodiode arrays comprises diffusing a crystal of, for example, InSb with a p-layer, rendering certain portions of the p-layer resistant to chemical etching while leaving other portions non-resistant by subjecting the p-layer to ultraviolet light shined through a photo mask placed over the p-layer, removing the photo mask, etching, and then attaching the various required connectors. These techniques are all well known and require no further explanation to those skilled in the art.

In the prior art, when a curved array of photodiodes has been desired, it has been the practice to approximate a curve with a plurality of flat subarrays. This practice has a disadvantage in that when flat subarrays are used close interelement spacing is not possible and registration between segments or subarrays must be compensated for with complicated electronics. Consequently, a need for a method for use in the fabrication of curved arrays of diodes to provide better matching with optical systems has been felt. Because of the delicate nature i.e., susceptability to chipping and the like, of the wafers from which diode arrays are made, the manufacture of curved arrays has not been heretofore practical.

SUMMARY OF THE INVENTION

The present invention provides a process for fabricating a curved array of InSb photovoltaic infrared detectors. The process involves lapping an InSb wafer on a silk wrapped lapping wheel, diffusing the lapped surface of the wafer, abutting the diffused lapped surface of the wafer to a film photo mask which is curved over a quartz lens having the same radius of curvature as that of the lapped wafer, subjecting the diffused lapped surface of the wafer to ultraviolet light by shining the light through the quartz lens and film photo mask, etching the wafer and attaching the required connectors.

DESCRIPTION OF THE PREFERRED EMBODIMENT

Figure 1:
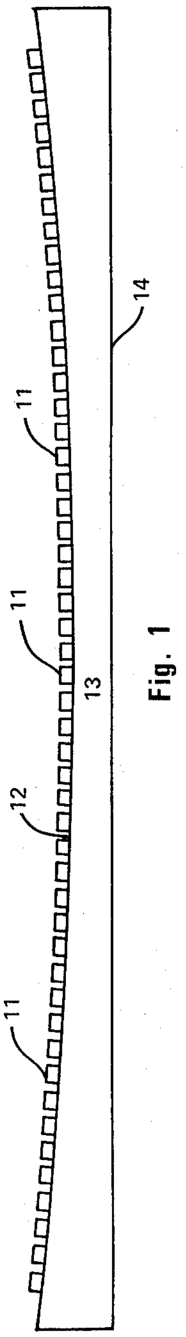
FIG. 1 is an elevational of a curved array of diodes prepared according to the method of this invention.

Going first to the drawing, FIG. 1 is an elevational view of a curved array of diodes 11 projecting from the curved surface 12 of an InSb wafer 13. The wafer has a flat base 14 which may be mounted to any suitable flat substrate. This FIGURE is shown merely to make it clear to the reader what is being fabricated. It should be noted here that material other than InSb could be used in lieu of the InSb specified.

Figure 2:
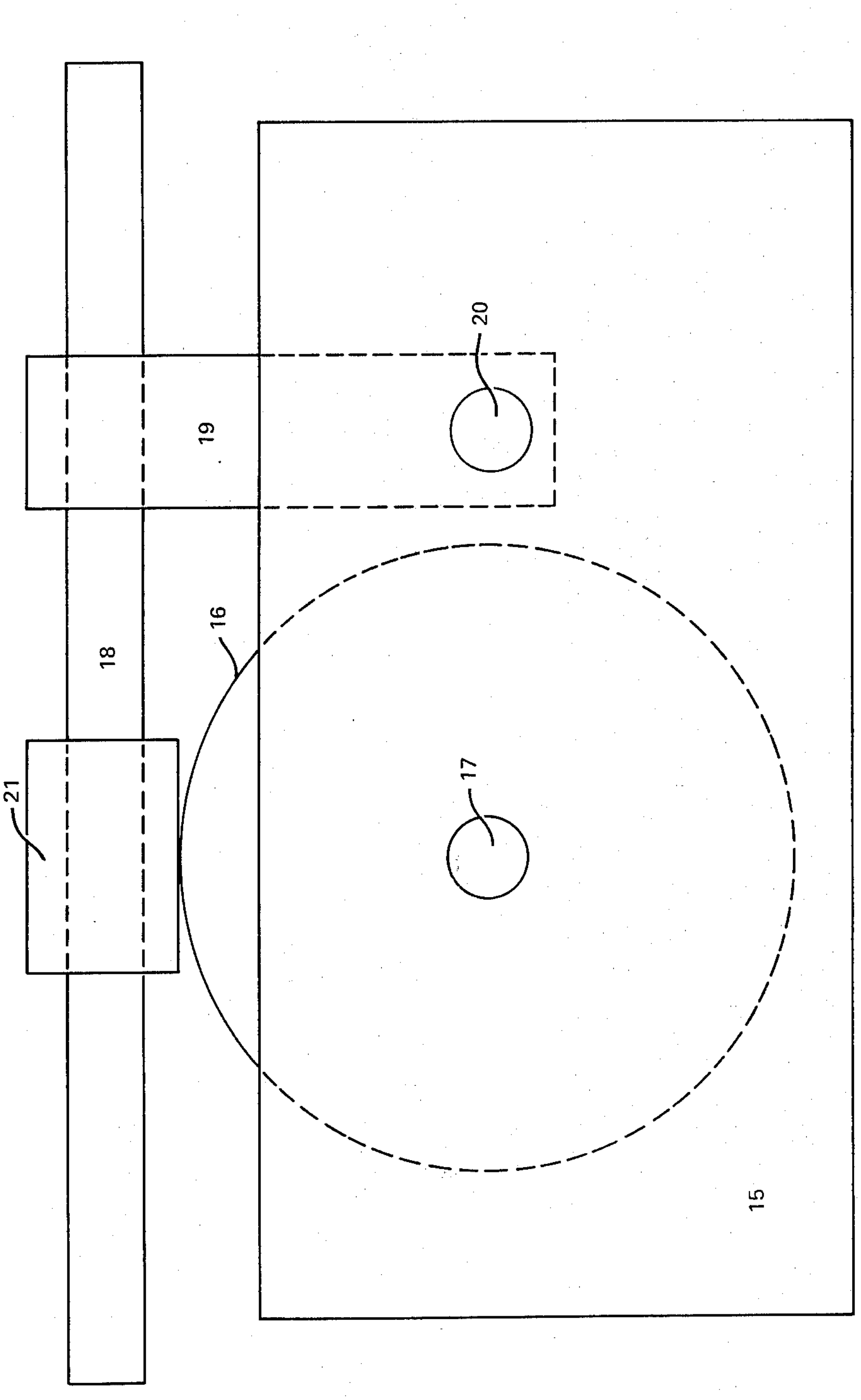
FIG. 2 is an elevational view of an arc lapper useful in the process of this invention.

FIG. 2 is an elevational view of an arc lapper suitable for use in fabricating a curved array of diodes of the type depicted in FIG. 1. The arc lapper comprises a housing 15 in which a lapping wheel 16 is mounted on a shaft 17. The shaft may be driven by an electric motor or the like (not shown). A pivot arm 18 is mounted on a pivot 19 which is, in turn, mounted on a shaft 20 is utilized to hold a mounting device 21 to which an InSb or the like wafer is mounted during a lapping operation.

Figure 3:
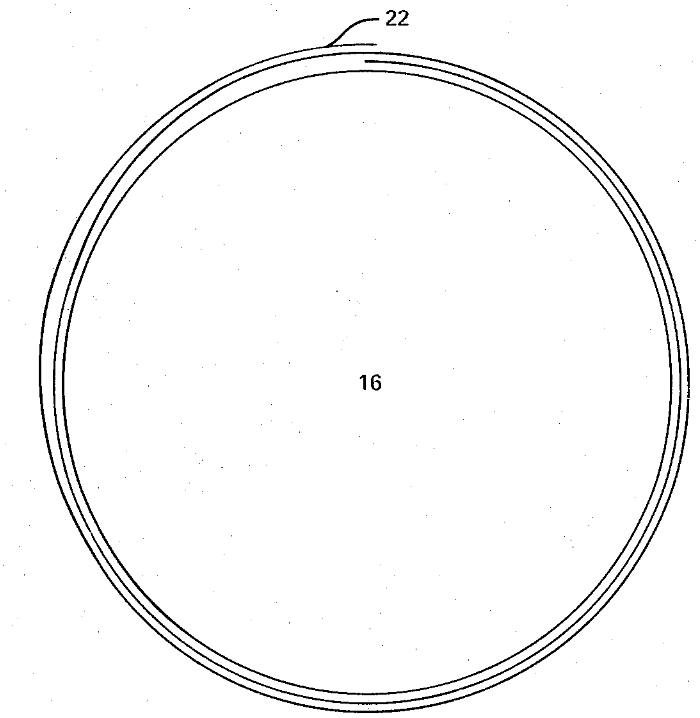
FIG. 3 is an elevational view of the lapping wheel of the arc lapper of FIG. 2 depicting how the wheel is wrapped with silk prior to lapping.

FIG. 3 is an elevational view of the lapping wheel 16 which is preferably fabricated from stainless steel or the like. FIG. 3 depicts the lapping wheel as being wrapped a double layer of wrapping material 22 prior to a lapping operation. It is preferable that the wrapping material be silk and a double layer is utilized to insure constant thickness. Silk is the preferred wrapping material because of its gentleness during lapping. The silk is attached to the wheel by clamping devices similar to a hose clamp (not shown), which ride outside the crystal being lapped during a lapping operation.

In a lapping operation, the starting material to be lapped for purposes of this disclosure is a Czochralski grown single crystal of InSb cut on the (111) orientation. A wafer is cut from the crystal with a wiresaw or the like and polished on both sides with 10 $\mu$ aluminum oxide grit or smaller to remove saw work damage. The wafer is then mounted on the lapper shown in FIG. 2 with the base side up. Lapping is accomplished by rotating the silk wrapped drum at about 1 rpm. During lapping the silk is soaked in a slurry composed of water and 5 $\mu$ $Al_2O_3$ grit. A suitable slurry may be prepared by mixing about 9 parts by volume of triple distilled water with 1 part by volume of grit. The silk may be saturated by means of a squeeze bottle or the like. The wafer is lapped until the arc is approximately 0.100 inch longer than the length desired for the array. (The arc length lapped into the crystal is not critical; however, an edge allowance of at least 0.015 to 0.020 inch should be made from the last delineated array element to the InSb wafer edge.) When the arc reaches this length the wafer is removed from the arc lapper and cleaned.

After cleaning, the wafer is chemically polished to remove work damage. Chemical polishing may be accomplished with a mixture containing about 92 parts by weight methyl alcohol and 8 parts by weight bromine. This polishing operation tends to round the edges of the wafer but curvature in the array area is maintained due to the extra length lapped into the wafer.

After the chemical polishing operation is completed, the wafer is diffused using standard techniques commonly used for flat arrays.

Figure 4:
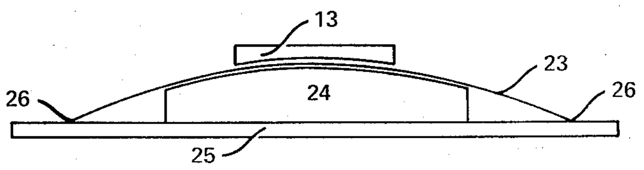
FIG. 4 is an elevational view depicting how a curved film photo mask is applied to a lapped crystal.

In order to provide for sharp definition of all diodes, it is necessary to use a curved photo mask in rendering the desired portions of the diffused p-layer etch retardent. The technique for applying a curved mask is illustrated in FIG. 4. The mask 23, which is fabricated from film, is stretched over a curved quartz lens 24 which has been machined to have the same curvature as the array. The quartz lens 24 is mounted on a quartz disc 25 and the mask 23 is fastened to the quartz disc base along its ends 26, 26' by plastic tape or the like. The curved diffused surface of the wafer 13 is then abutted to the mask as indicated in the drawing and subjected to ultraviolet light which is shined through the quartz and photo mask. After this, etching and the attachment of the various connections is carried out by means of processes commonly used in the fabrication of flat arrays.

We claim:

1. A method for fabricating a curved photodiode array comprising, a. lapping an arc having the desired curvature into one surface of a wafer which is to contain the array with a silk wrapped lapping wheel rotated at about 1 rpm;

b. chemically polishing the arced wafer;

c. diffusing the arced surface of the wafer;

d. abutting the diffused arced surface of the wafer to a curved film photo mask held in place over a curved quartz lens machined to have a curvature which corresponds to the arc in the wafer;

e. subjecting the diffused arced surface of the wafer to ultraviolet light shined through said quartz lens and said film photo mask to render desired portions of it resistant to etching;

f. etching the diffused arced surface of the wafer; and g. attaching the required connections.

* * * * *